US010402357B1

(12) United States Patent
Rao et al.

(10) Patent No.: US 10,402,357 B1
(45) Date of Patent: Sep. 3, 2019

(54) SYSTEMS AND METHODS FOR GROUP MANAGER BASED PEER COMMUNICATION

(71) Applicant: Dell Products L.P., Round Rock, TX (US)

(72) Inventors: Balaji Bapu Gururaja Rao, Austin, TX (US); Anto DolphinJose Jesurajan Marystella, Round Rock, TX (US); Yogesh P. Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/951,313

(22) Filed: Apr. 12, 2018

(51) Int. Cl.
*G06F 13/40* (2006.01)
*G06F 12/00* (2006.01)
*G06F 3/06* (2006.01)

(52) U.S. Cl.
CPC ...... *G06F 13/4022* (2013.01); *G06F 13/4068* (2013.01)

(58) Field of Classification Search
None
See application file for complete search history.

(56) References Cited

U.S. PATENT DOCUMENTS

2017/0317892 A1* 11/2017 Tung ............... H04L 41/24

* cited by examiner

*Primary Examiner* — Scott C Sun
(74) *Attorney, Agent, or Firm* — Jackson Walker L.L.P.

(57) ABSTRACT

In accordance with embodiments of the present disclosure, a system may include a rack configured to receive a plurality of server information handling systems, each server information handling system comprising a respective baseboard management controller and a rack manager configured to communicatively couple to each of the respective baseboard management controllers. The rack manager may further be configured to communicate handshake management traffic to each of the respective baseboard management controllers via a management interface coupled between the rack manager and the respective baseboard management controller and communicate sustenance management traffic to a single baseboard management controller selected as a group manager of the respective baseboard management controllers, wherein the single baseboard management controller is configured to further communicate the sustenance management traffic to the respective baseboard management controllers other than the single baseboard management controller.

18 Claims, 3 Drawing Sheets

SYSTEMS AND METHODS FOR GROUP MANAGER BASED PEER COMMUNICATION

TECHNICAL FIELD

The present disclosure relates in general to information handling systems, and more particularly to group manager based peer communication among information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a data center of multiple information handling systems (e.g., server nodes), a rack manager may be employed as a management system that may manage multiple (e.g., upwards of 80) server nodes. Management traffic between the rack manager and server nodes may be communicated over a relatively slow management interface (e.g., Inter-Integrated Circuit or "I2C" bus). Thus, in existing approaches, management traffic may form a continuous 1-to-N data exchange between a rack manager and baseboard management controllers of the server nodes. The slow communication interface, coupled with duplication of the same data that the rack manager may repetitively send to multiple compute nodes (e.g., chassis configuration information, sensor information, power supply information, etc.), may form a significant bottleneck, which may slow the rack manager down to the point of service interruption.

SUMMARY

In accordance with the teachings of the present disclosure, disadvantages and problems associated with communication between a rack manager and information handling systems may be reduced or eliminated.

In accordance with embodiments of the present disclosure, a system may include a rack configured to receive a plurality of server information handling systems, each server information handling system comprising a respective baseboard management controller and a rack manager configured to communicatively couple to each of the respective baseboard management controllers. The rack manager may further be configured to communicate handshake management traffic to each of the respective baseboard management controllers via a management interface coupled between the rack manager and the respective baseboard management controller and communicate sustenance management traffic to a single baseboard management controller selected as a group manager of the respective baseboard management controllers, wherein the single baseboard management controller is configured to further communicate the sustenance management traffic to the respective baseboard management controllers other than the single baseboard management controller.

In accordance with these and other embodiments of the present disclosure, a method may comprise, in a system comprising a rack configured to receive a plurality of server information handling systems, each server information handling system comprising a respective baseboard management controller and a rack manager configured to communicatively couple to each of the respective baseboard management controllers and further configured to communicate handshake management traffic from the rack manager to each of the respective baseboard management controllers via a management interface coupled between the rack manager and the respective baseboard management controller and communicate sustenance management traffic from the rack manager to a single baseboard management controller selected as a group manager of the respective baseboard management controllers, wherein the single baseboard management controller is configured to further communicate the sustenance management traffic to the respective baseboard management controllers other than the single baseboard management controller.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in a system comprising a rack configured to receive a plurality of server information handling systems, each server information handling system comprising a respective baseboard management controller and a rack manager configured to communicatively coupled to each of the respective baseboard management controllers: communicate handshake management traffic from the rack manager to each of the respective baseboard management controllers via a management interface coupled between the rack manager and the respective baseboard management controller and communicate sustenance management traffic from the rack manager to a single baseboard management controller selected as a group manager of the respective baseboard management controllers, wherein the single baseboard management controller is configured to further communicate the sustenance management traffic to the respective baseboard management controllers other than the single baseboard management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
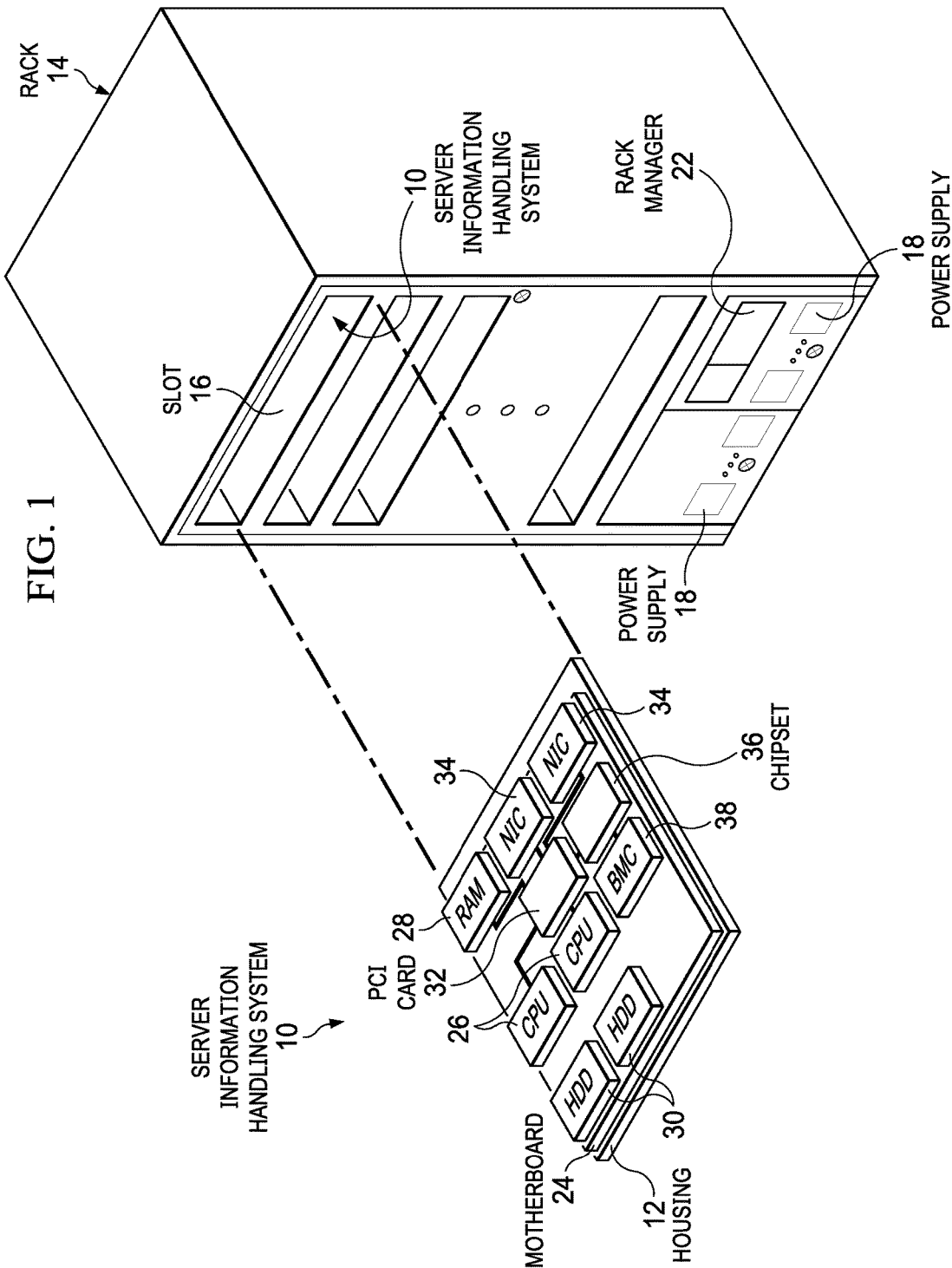
FIG. 1 illustrates a perspective view of an example information handling system, in accordance with embodiments of the present disclosure.
Figure 2:
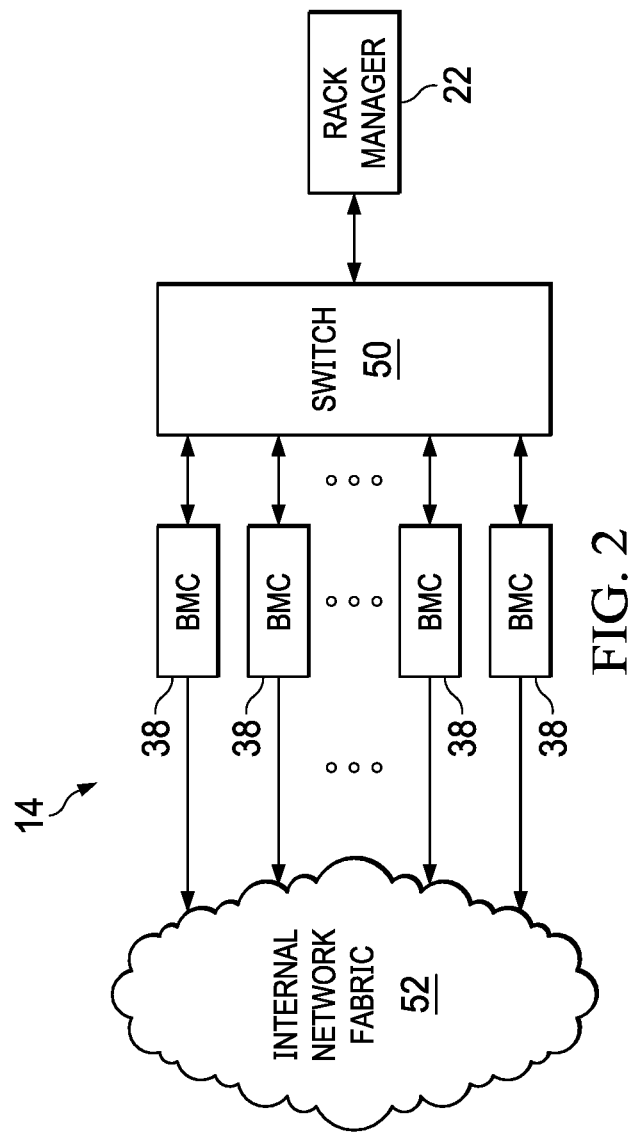
FIG. 2 illustrates a block diagram of selected components of an information handling system rack, in accordance with embodiments of the present disclosure.
Figure 3:
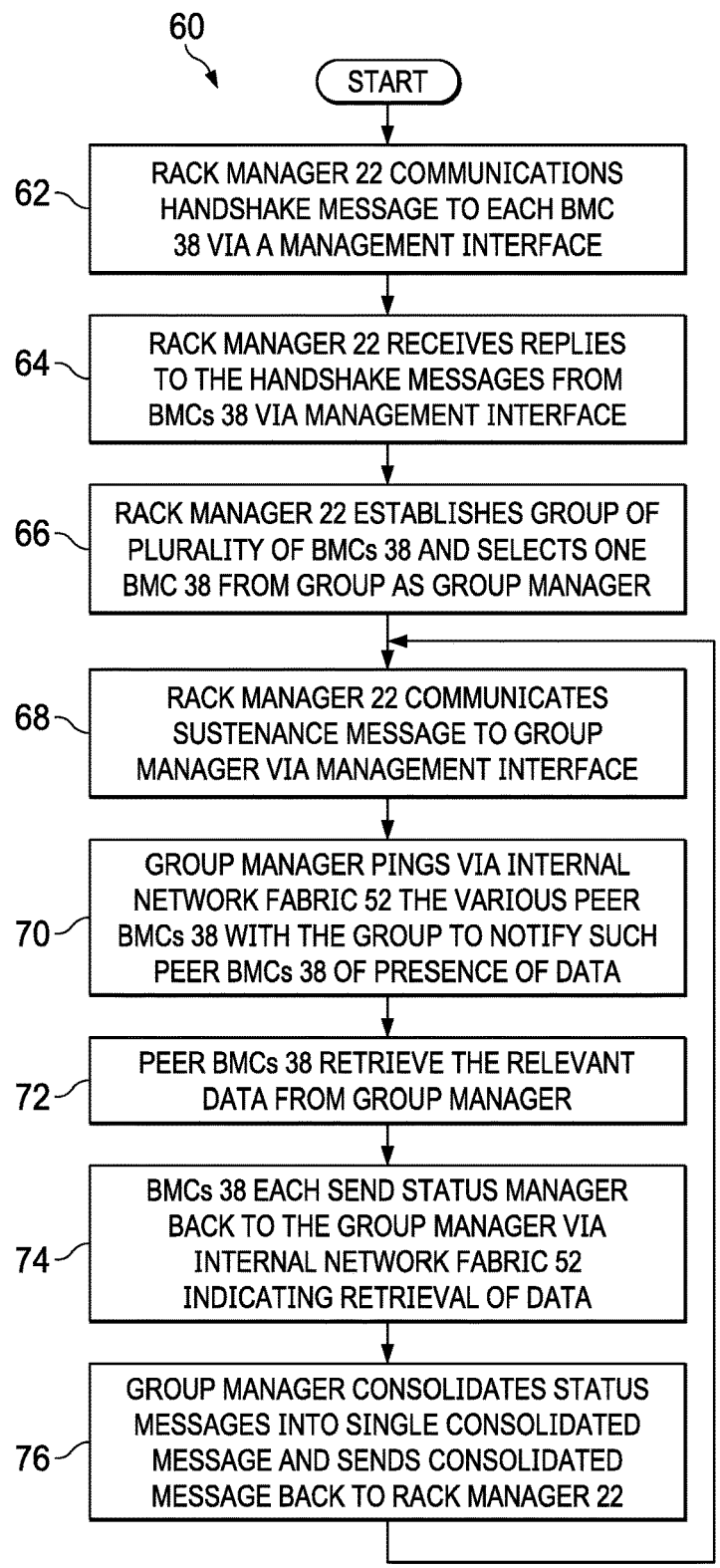
FIG. 3 illustrates a flow chart of an example method for group manager based peer communication, in accordance with embodiments of the present disclosure.

Preferred embodiments and their advantages are best understood by reference to FIGS. 1 through 3, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a perspective view of an example information handling system 10, in accordance with embodiments of the present disclosure. As shown in FIG. 1, information handling system 10 may comprise a server built into a housing 12 that resides with one or more other information handling systems 10 in a rack 14. Rack 14 may comprise a plurality of vertically-stacked slots 16 that accept information handling systems 10 and a plurality of power supplies 18 that provide electrical energy to information handling systems 10. Power supplies 18 may be assigned power based upon availability at the data center and may allocate power to individual information handling systems 10 under the management of a rack manager 22. Rack manager 22 may aid coordination of operating settings so that information handling systems 10 do not exceed thermal or power usage constraints.

Housing 12 may include a motherboard 24 that provides structural support and electrical signal communication for processing components disposed in housing 12 that cooperate to process information. For example, one or more central processing units (CPUs) 26 may execute instructions stored in random access memory (RAM) 28 to process information, such as responses to server requests by client information handling systems remote from information handling system 10. One or more persistent storage devices, such as hard disk drives (HDD) 30 may store information maintained for extended periods and during power off states. A backplane communications manager, such as a PCI card 32, may interface processing components to communicate processed information, such as communications between CPUs 26 and network interface cards (NICs) 34 that are sent through a network, such as a local area network. A chipset 36 may include various processing and firmware resources for coordinating the interactions of processing components, such as a basic input/output system (BIOS). A baseboard management controller (BMC) 38 may interface with chipset 36 to provide out-of-band management functions, such as remote power up, remote power down, firmware updates, and power management. For example, BMC 38 may receive an allocation of power from rack manager 22 and monitor operations of the processing components of information handling system 10 to ensure that power consumption does not exceed the allocation. As another example, BMC 38 may receive temperatures sensed by temperature sensors and apply the temperatures to ensure that thermal constraints are not exceeded.

In general, rack manager 22 may comprise any system, device, or apparatus for management of the various server information handling systems 10 within rack 14 and may be coupled to BMC 38 of each server information handling system 10 via a management interface (e.g., I2C bus). In operation, rack manager 22 may serve as a management interface between a user (e.g., an administrator or information technology professional) and the various server information handling systems 10 thus allowing such a user to manage server information handling systems 10 (e.g., monitor operation of server information handling systems 10, configure operation of server information handling systems 10, etc.).

FIG. 2 illustrates a block diagram of selected components of information handling system rack 14, in accordance with embodiments of the present disclosure. As shown in FIG. 2, a switch 50 may be interfaced between rack manager 22 and various BMCs 38. Such switch 50 may comprise any suitable switch for routing instructions, data, commands, and messages between rack manager 22 and individuals BMCs 38, including without limitation an Intelligent Platform Management Bus (IPMB) switch. Also as shown in FIG. 2, BMCs 38 may be coupled to one another via an internal network fabric 52 internal to rack 14. In some embodiments, internal network fabric 52 may comprise an Ethernet fabric. In these and other embodiments, switch 50 may be used to implement internal network fabric 52 despite being shown as independent from internal network fabric 52 in FIG. 2. In these and other embodiments, internal network fabric 52 may comprise a multicast network.

In operation, management traffic communicated between rack manager 22 and BMCs 38 may be classified into one of at least two categories based on the function of such traffic. One category may be called "handshake" traffic, which may be traffic communicated between rack manager 22 and BMCs 38 for the purposes of discovery by rack manager 22 of BMCs 38 and server information handling systems 10 present within rack 14 (e.g., GetDeviceID or similar commands communicated from rack manager 22 to BMCs 38). Another category may be called "sustenance" traffic, which may be traffic communicated between rack manager 22 and BMCs 38 for the purposes of configuration, sensor information, power supply information, and/or other information for managing a server information handling system 10 once it has been discovered. To minimize traffic bottlenecks in communication between rack manager 22 and BMCs 38, rack manager 22 may be configured to communicate handshake traffic to and receive handshake traffic from each BMC 38 via the management interface, in a 1-to-N exchange. However, after handshake is completed, rack manager 22 may designate a plurality of BMCs 38 to be part of a single group, and select from such group of BMCs 38 a group manager. Then, for sustenance traffic, rack manager 22 may communicate with the group manager, and the group manager may in turn communicate with the other BMCs 38 to communicate the sustenance traffic. Thus, sustenance traffic which is not specific to a particular BMC 38 may be sent only once to the group manager. Once a command is received at the group manager from rack manager 22, it may ping the various peer BMCs 38 within the group to notify such peer BMCs 38 of the presence of data. Peer BMCs 38 may retrieve the data from the group manager and may each send a status message back to the group manager indicating that it has retrieved the data. The group manager may then consolidate the status messages and send a single consolidated message back to rack manager 22. In some embodiments, such consolidated status message may be sent to rack manager 22 on a periodic basis.

FIG. 3 illustrates a flow chart of an example method 60 for group manager based peer communication, in accordance with embodiments of the present disclosure. According to certain embodiments, method 60 may begin at step 62. As noted above, teachings of the present disclosure may be implemented in a variety of configurations of server information handling system 101. As such, the preferred initialization point for method 60 and the order of the steps comprising method 60 may depend on the implementation chosen. In these and other embodiments, method 60 may be implemented as firmware, software, applications, functions, libraries, or other instructions.

At step 62, rack manager 22 may communicate a handshake message to each BMC 38 via a management interface. At step 64, rack manager 22 may receive replies to the handshake messages from BMCs 38 via the management interface. At step 66, rack manager 22 may establish a group of a plurality of BMCs 38 and select one BMC 38 from the group as a group manager.

At step 68, rack manager 22 may communicate a sustenance message (e.g., configuration, sensor information, power supply information, and/or other information for managing a server information handling system 10 once it has been discovered) which is not specific to a single BMC 38 of the group to the group manager. Such sustenance message may be communicated via the management interface. At step 70, the group manager may ping (e.g., via internal network fabric 52) the various peer BMCs 38 within the group to notify such peer BMCs 38 of the presence of data. At step 72, the peer BMCs 38 may retrieve the relevant data from the group manager. At step 74, the various peer BMCs 38 may each send a status message back to the group manager via internal network fabric 52 indicating that it has retrieved the data. At step 76, the group manager may then consolidate the status messages and send a single consolidated message back to rack manager 22. After completion of step 76, method 60 may proceed again to step 68.

Although FIG. 3 discloses a particular number of steps to be taken with respect to method 60, method 60 may be executed with greater or fewer steps than those depicted in FIG. 3. In addition, although FIG. 3 discloses a certain order of steps to be taken with respect to method 60, the steps comprising method 60 may be completed in any suitable order.

Method 60 may be implemented using rack manager, components thereof, and/or any other system operable to implement method 60. In certain embodiments, method 60 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
a rack configured to receive a plurality of server information handling systems, each server information handling system comprising a respective baseboard management controller; and
a rack manager configured to communicatively couple to each of the respective baseboard management controllers and further configured to:
communicate handshake management traffic to each of the respective baseboard management controllers via a management interface coupled between the rack manager and the respective baseboard management controller; and
communicate sustenance management traffic to a single baseboard management controller selected as a group manager of the respective baseboard management controllers, wherein the single baseboard management controller is configured to further communicate the sustenance management traffic to the respective baseboard management controllers other than the single baseboard management controller.

2. The system of claim 1, wherein:
the rack manager is configured to communicate the sustenance management traffic to the single baseboard management controller via the management interface; and
the single baseboard management controller is configured to communicate the sustenance management traffic to the respective baseboard management controllers other than the single baseboard management controller via a network fabric interface.

3. The system of claim 2, wherein the network fabric interface comprises an Ethernet multicast network.

4. The system of claim 1, wherein:
in response to receiving a command of the sustenance management traffic from the rack manager, the single baseboard management controller is configured to communicate an indication to the respective baseboard management controllers other than the single baseboard management controller that sustenance data is available; and
in response to the indication that sustenance data is available, each respective baseboard management controller other than the single baseboard management controller is configured to retrieve the sustenance data and communicate a respective reply to the single baseboard management controller that it has retrieved the data.

5. The system of claim 4, wherein the single baseboard management controller is configured to consolidate the respective replies into a consolidated reply.

6. The system of claim 5, wherein the rack manager is further configured to receive the consolidated reply.

7. A method comprising, in a system comprising a rack configured to receive a plurality of server information handling systems, each server information handling system comprising a respective baseboard management controller and a rack manager configured to communicatively couple to each of the respective baseboard management controllers and further configured to:
communicate handshake management traffic from the rack manager to each of the respective baseboard management controllers via a management interface coupled between the rack manager and the respective baseboard management controller; and
communicate sustenance management traffic from the rack manager to a single baseboard management controller selected as a group manager of the respective baseboard management controllers, wherein the single baseboard management controller is configured to further communicate the sustenance management traffic to the respective baseboard management controllers other than the single baseboard management controller.

8. The method of claim 7, further comprising:
communicating the sustenance management traffic from the rack manager to the single baseboard management controller via the management interface; and
wherein the single baseboard management controller is configured to communicate the sustenance management traffic to the respective baseboard management controllers other than the single baseboard management controller via a network fabric interface.

9. The method of claim 8, wherein the network fabric interface comprises an Ethernet multicast network.

10. The method of claim 7, wherein:
in response to receiving a command of the sustenance management traffic from the rack manager, the single baseboard management controller is configured to communicate an indication to the respective baseboard management controllers other than the single baseboard management controller that sustenance data is available; and
in response to the indication that sustenance data is available, each respective baseboard management controller other than the single baseboard management controller is configured to retrieve the sustenance data and communicate a respective reply to the single baseboard management controller that it has retrieved the data.

11. The method of claim 10, wherein the single baseboard management controller is configured to consolidate the respective replies into a consolidated reply.

12. The method of claim 11, further comprising receiving by the rack manager the consolidated reply from the single baseboard management controller.

13. An article of manufacture, comprising
a non-transitory computer readable medium; and
computer-executable instructions carried on the computer readable medium, the instructions readable by a processor, the instructions, when read and executed, for causing the processor to, in a system comprising a rack configured to receive a plurality of server information handling systems, each server information handling system comprising a respective baseboard management controller and a rack manager configured to communicatively coupled to each of the respective baseboard management controllers:
communicate handshake management traffic from the rack manager to each of the respective baseboard management controllers via a management interface coupled between the rack manager and the respective baseboard management controller; and
communicate sustenance management traffic from the rack manager to a single baseboard management controller selected as a group manager of the respective baseboard management controllers, wherein the single baseboard management controller is configured to further communicate the sustenance management traffic to the respective baseboard management controllers other than the single baseboard management controller.

14. The article of claim 13, the instructions for further causing the processor to:
communicate the sustenance management traffic from the rack manager to the single baseboard management controller via the management interface; and
wherein the single baseboard management controller is configured to communicate the sustenance management traffic to the respective baseboard management controllers other than the single baseboard management controller via a network fabric interface.

15. The article of claim 14, wherein the network fabric interface comprises an Ethernet multicast network.

16. The article of claim 13, wherein:
in response to receiving a command of the sustenance management traffic from the rack manager, the single baseboard management controller is configured to communicate an indication to the respective baseboard management controllers other than the single baseboard management controller that sustenance data is available; and
in response to the indication that sustenance data is available, each respective baseboard management controller other than the single baseboard management controller is configured to retrieve the sustenance data and communicate a respective reply to the single baseboard management controller that it has retrieved the data.

17. The article of claim 16, wherein the single baseboard management controller is configured to consolidate the respective replies into a consolidated reply.

18. The article of claim 17, the instructions for further causing the processor to receive by the rack manager the consolidated reply from the single baseboard management controller.

* * * * *